United States Patent [19]

Foster, III et al.

[11] Patent Number: 5,189,279
[45] Date of Patent: Feb. 23, 1993

[54] STEAM TURBINE ROTOR WELDING

[75] Inventors: Walter H. Foster, III, Jaffrey, N.H.; Lawrence D. Sparks, Bangor, Me.; Louis P. Earvolino, Holliston, Mass.; Fred DeSaw, Columbus, Ohio

[73] Assignee: General Electric Company, Schenectady, N.Y.

[21] Appl. No.: 813,746

[22] Filed: Dec. 30, 1991

[51] Int. Cl.$^5$ .............................................. B23K 9/04
[52] U.S. Cl. ................................ 219/137 R; 219/76.14
[58] Field of Search ...................... 219/137 R, 76.14; 228/119

[56] References Cited

U.S. PATENT DOCUMENTS

| | | | |
|---|---|---|---|
| 1,469,566 | 10/1923 | Weishaupl | 29/889.2 |
| 1,734,930 | 11/1929 | Weaver | 29/889.2 |
| 2,062,460 | 12/1936 | Lee | 29/33 |
| 3,611,541 | 10/1971 | Garrett | 29/401 |
| 3,666,909 | 5/1972 | Smitmajer et al. | 219/76 |
| 3,707,613 | 12/1972 | Ujile | 219/76 |
| 3,741,821 | 6/1973 | Athey et al. | 148/13.1 |
| 3,985,995 | 10/1976 | Brandi et al. | 219/76 |
| 4,086,690 | 5/1978 | Bernasconi | 29/156.8 |
| 4,213,025 | 7/1980 | Kuhnen | 219/73.2 |
| 4,219,717 | 8/1980 | Kuhnen | 219/61 |
| 4,237,361 | 12/1980 | Zwintscher et al. | 219/76.1 |
| 4,567,649 | 2/1986 | Ades et al. | 29/800 |
| 4,570,053 | 2/1986 | Ades et al. | 219/413 |
| 4,590,653 | 5/1986 | Ades et al. | 29/156.8 |
| 4,633,554 | 1/1987 | Clark et al. | 29/156.4 |
| 4,635,336 | 1/1987 | Ades et al. | 29/252 |
| 4,832,252 | 5/1989 | Fraser | 228/119 |
| 4,838,069 | 6/1989 | Walker et al. | 72/342 |
| 4,884,326 | 12/1989 | Porter et al. | 29/156.8 |
| 4,897,519 | 1/1990 | Clark et al. | 219/76.14 |
| 4,903,888 | 2/1990 | Clark et al. | 228/119 |
| 4,940,390 | 7/1990 | Clark et al. | 416/241 |
| 4,948,936 | 8/1990 | Landry | 210/76.14 |
| 4,958,431 | 9/1990 | Clark et al. | 29/889.1 |
| 5,085,363 | 2/1992 | Sims | 219/76.14 |

OTHER PUBLICATIONS

"Experiences With Weld Repair of Low Pressure Steam Turbine Rotors", Westinghouse Electric Corp., 1985.
"Development of the Techniques for High Pressure Rotor Weld Repair", Clark et al., Westinghouse Electric Corp., 1987.

Primary Examiner—Clifford C. Shaw
Attorney, Agent, or Firm—Nixon & Vanderhye

[57] ABSTRACT

A process for welding a rotatable machine component is provided which includes the steps of rotating the component about a longitudinal axis of rotation thereof; preheating an area of the component to be welded; depositing a plurality of weld beads in the area; post weld heat treating the area; and cooling the area to room temperature. During the entire process from preheating through cooling, the component is continuously rotated about its longitudinal axis.

20 Claims, 5 Drawing Sheets

STEAM TURBINE ROTOR WELDING

BACKGROUND AND SUMMARY OF THE INVENTION

This invention relates to rotating machine components and to a method of repairing such components, particularly turbine rotors, via welding.

Steam turbine rotor materials, for example, typically are not selected on the basis of their weldability. Rather, materials are identified and selected specifically to provide a highly reliable rotating element that will withstand the normal conditions that such equipment experiences during plant operations. With advances in welding/metallurgical technology, however, the option of rotor weld repairs and turbine rotor upgrades are viable solutions for an equipment user. Of course, no weld repair or upgrade should be undertaken without proper controls, a full understanding of the design intent, and the material type or types involved in the fabrication.

Rotor weld repairs are performed for many reasons. Some of these reasons are convenience, maintenance of interchangeability, cost, and the need to bring the machine back on line in a timely manner. It is also possible to redesign using existing rotor forgings, when there is an understanding of the basic design parameters of the machine. Upgrading or repairing in this manner, if carried out in accordance with a precise methodology, can result in a less costly alternative to new parts.

Several problems are encountered in welding rotating elements. The two principal problems relate to distortion and material property changes. Either of these factors will adversely effect the reliable operation of, for example, a steam turbine rotor. It is therefore important to understand that certain turbine rotor materials and associated parts are more weldable than others, and that the selection of the welding option not only depends upon the type of material to be used in the welding process, but also upon the conditions to which the elements to be welded will be subjected in service.

Numerous attempts to provide a workable process for turbine rotor welding have been documented in the patent literature. For example, see U.S. Pat. Nos. 4,958,431; 4,940,390; 4,903,888; and 4,897,519 which describe repair procedures for worn and/or damaged surfaces of turbine components where the components are rotated during the welding process. A post-weld heat treatment operation may be provided as a stress relief measure.

U.S. Pat. No. 4,884,326 discloses a method and apparatus for repairing and resurfacing turbine liner walls during rotation of the turbine shaft and turbine blades.

U.S. Pat. No. 4,237,361 discloses a method of building up layers of metal on a region of a workpiece by fusion arc welding. The patent specifically discloses reconditioning a shaft for a turbine rotor by building up the surface of a shaft while the latter is rotated under a main welding head.

The attempts at providing a successful rotor welding repair procedure to date have been less than completely satisfactory, particularly in light of the many considerations involved in obtaining a successful weld repair. For example, a steam turbine rotor, although a single rotating element, is subjected to many complex stresses. Changes in the design parameters can have a very significant impact on the service life as well as short term reliability of the turbine. For example, steam turbine rotors, by design, are subjected to various lateral and torsional vibration levels, and changes in the shaft mass center, uniform stiffness and configuration generally can increase and/or change the sensitivity response to shaft vibration levels. These changes can dramatically effect operating stresses which can, in turn, affect the ability to operate at full load, and can also result in substantial reduction and fatigue life.

Another major factor in rotor welding, apart from mechanical integrity, is the concern for rotor stability. A rotor that is dynamically unstable as a result of welding is as much a failure of the weld process as is poor mechanical properties in the weld material. Dynamic instability is a condition where an unbalance or shift in rotor mass away from the shaft centerline has occurred during the welding operation. This shift can result from shaft distortion which, in turn, can result from uneven heat distribution in the shaft during welding or during post-weld heat treatment processes. Distortion can also result from non-uniform stress distribution which has caused plastic yielding of the shaft material. Ultimately, distortion affects the shaft in some form of dynamic instability. This instability is the key component in any rotational fatigue type failure.

In order to control possible shifting of mass or distortion in a shaft, the understanding of the influences of welding and post-weld heat treatment processes must be obtained first. Welding processes impart a combination of compressive and tensile stresses into the base material. As weld material cools, it contracts and hoop stresses also occur in the base metal. The weld also puts the base metal fibers into tension. These tensile and compressive stresses are not uniform in the base metal due to lack of uniformity in each weld pass. To counter these stresses, it is necessary to weld in such a manner as to reduce stresses, such as, for example, by employing a temper bead weld technique. In accordance with the technique, weld beads are overlapped in such a way as to temper the previous weld pass, thus subsequently reducing the overall stresses due to levels welding.

Although most of the weld stresses can be reduced by welding techniques, not all such stresses can be eliminated. It is therefore necessary to perform post-weld heat treatment (PWHT) on each weld repair to remove any residual stresses remaining in the weld. Distortion can also occur in PWHT processes, however, as a result of uneven heating or poorly configured heating elements. This distortion is brought about by a sag or bend in the shaft due to uneven axial and radial growth during heating.

In order to counter these effects, a heat treatment process in accordance with this invention can be utilized where the shaft is continuously rotated about its longitudinal axis not only through preheat, welding, and PWHT, but also through subsequent cooling to room temperature.

In this process, described for exemplary purposes in conjunction with a steam turbine rotor, the rotor is placed in a horizontal position and, after machining to remove the defect, is continually rotated about its longitudinal axis or centerline during preheat and welding. Heating under these conditions will greatly reduce the possibility of rotor sag. With the addition of load compensating centers, the shaft can grow axially without restraint.

The process also involves local PWHT through the use of high-frequency induction (HFI) heating. In this way, a shaft may be heated in a uniform manner so as to avoid distortion due to uneven axial and radial growth. HFI heating process also allows for a variety of heating methods. For example, HFI can be utilized in a case-hardening manner so as to stress relieve an inlay/overlay type weld. In this method, the entire shaft is not heated, since the only area that needs stress relieving is the welded surface. This reduces distortion by minimizing heat input to the shaft and allows for a constant shaft rotation. For example, HFI heating may also be used in otherwise conventional heat treatment processes. HFI may be used, for example, to heat the shaft, so that heat is allowed to conduct through the shaft, thereby stress relieving larger welded areas. Again, HFI allows for controlled and even heat input and constant shaft rotation, all key factors for distortion control.

Another feature of this invention is the continuation of shaft rotation after welding during PWHT and throughout the cooling of the rotor to room temperature, to further insure uniform distribution of remaining stresses in the weld material and in the base metal. Machining to final dimensions may then be carried out in accordance with required specifications.

Thus, in accordance with its broader aspects, a process for welding a rotatable machine component is provided which includes the steps of:

a) rotating the component about a longitudinal axis of rotation thereof;

b) preheating an area of the component to be welded;

c) depositing a plurality of weld beads in the area;

d) post weld heat treating the area; and e) cooling the area to room temperature;

wherein steps b) through e) are carried out during continuous rotation of the component.

It is a further preferred feature of the invention that the welding step be carried out by a submerged arc welding process, and that the preheating and post weld heat treating operations be carried out by high frequency induction heating.

Additional objects and advantages will become apparent from the detailed description which follows.

DETAILED DESCRIPTION OF THE DRAWINGS

The process in accordance with the invention will be described below in connection with an inlay/overlay weld in a low stress area — for example, a weld build-up to restore a bearing journal, in a steam turbine rotor.

Figure 1:
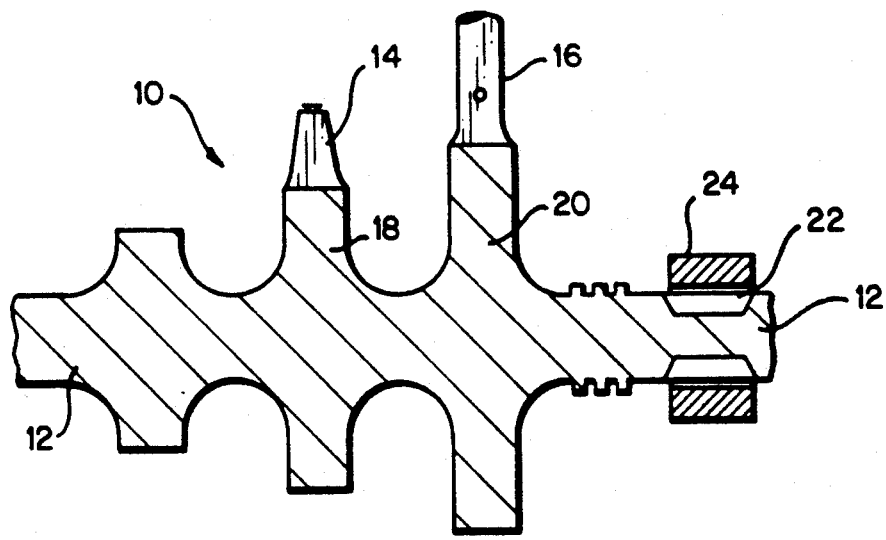
FIG. 1 is a cross section of a turbine rotor illustrating weld build-up to restore a bearing journal which may be achieved utilizing the process of this invention.

Referring to FIG. 1, a turbine rotor 10 is shown to include a shaft 12 mounting a plurality of turbine blades 14, 16, etc. and associated wheels 18, 20, etc. along the axial length of the rotor. The welded material as it will be described in conjunction with the process in more detail below, is applied in a low stress area of the rotor in the form of a circumferential weld build-up 22 which will restore a journal area for a bearing 24.

Figure 2:
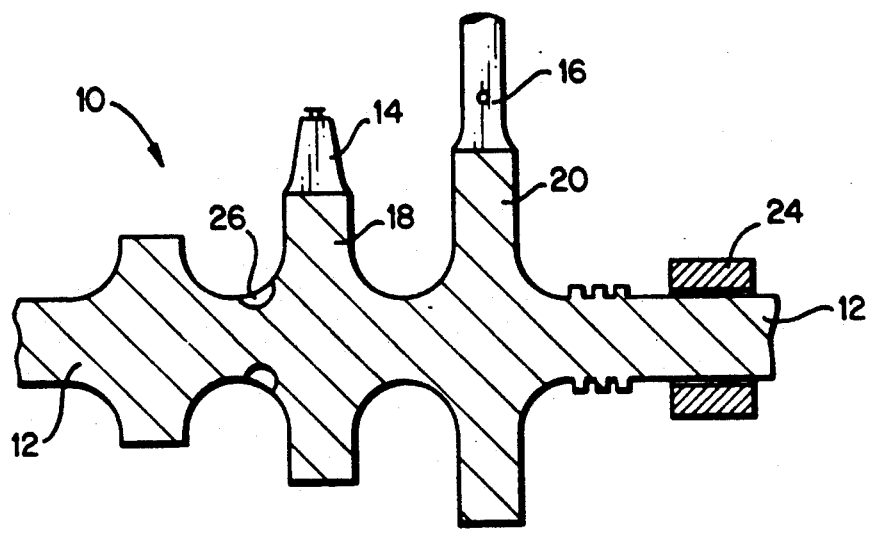
FIG. 2 is a cross section of a turbine rotor illustrating circumferential welding to repair a crack in the rotor which may be achieved by the process of this invention.

By way of further example, and with reference to FIG. 2, the process of this invention may also be utilized to apply a circumferential weld 26 to repair a crack in the rotor 10 in a fillet area between a wheel 18 and the shaft 12.

Figure 3:
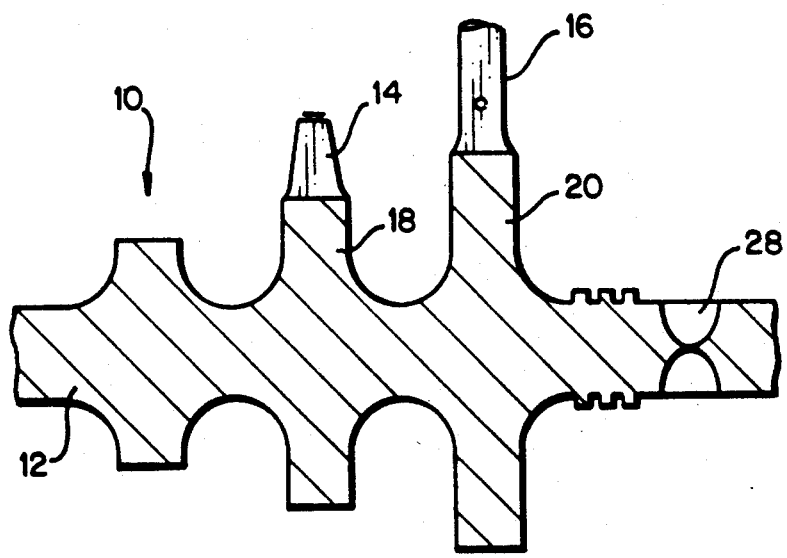
FIG. 3 is a cross section of a turbine rotor illustrating a stub shaft repair utilizing the process of this invention.

FIG. 3 illustrates a turbine rotor similar to that illustrated in FIGS. 1 and 2 with common reference numerals utilized where appropriate. In this illustration, a weld repair 28 is shown in a stub shaft portion of the rotor 10. The weld repair 28 may be carried out in accordance with the method disclosed herein.

Figure 4:
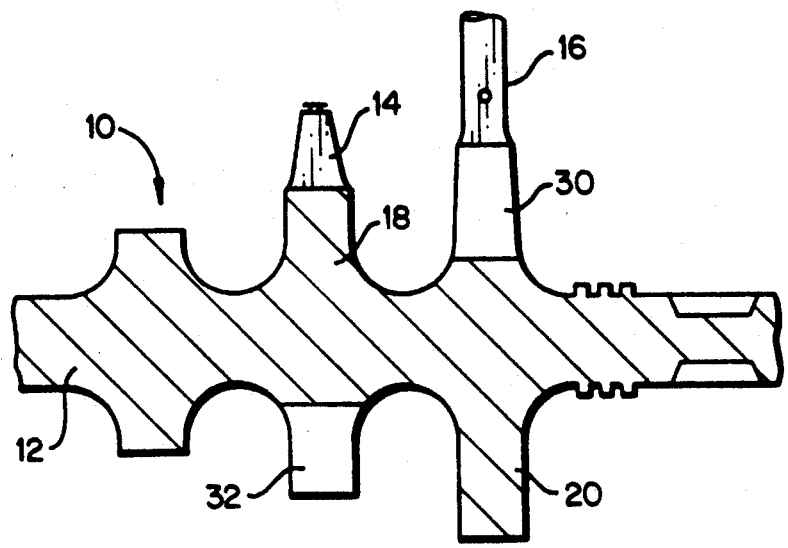
FIG. 4 is a cross section of a turbine rotor illustrating wheel build-up in accordance with the process of this invention.

Referring now to FIG. 4, another weld repair arrangement is illustrated in conjunction with a turbine rotor 10 (utilizing reference numerals common to the illustrations of FIGS. 1–3 where appropriate). In FIG. 4, the weld repair is in the form of a turbine wheel build-up illustrated at 30 in connection with wheel 20 and at 32 in connection with wheel 18. Here again, the method utilized in carrying out the repair is as disclosed hereinabove.

It will be appreciated, however, that the process described herein is not limited to the specific repairs above but is generally applicable to rotatable machine component welding repairs in general.

In a test program designed to confirm the efficiency of the process, Ni-MO-V steel similar to ASTM A470 Class 4 was chosen for the rotor because of its weldability and because it is frequently used in the fabrication of turbine rotors. It was further determined that submerged arc welding (SAW) is a particularly suitable welding technique, in part because it is also a manual or semi-automatic process where the potential for operator induced defects, with proper process controls, is kept at a minimum. Other welding procedures, however, such as shielded metal arc, gas tungsten arc and gas metal arc welding may also be employed. The filler metal/flux combination of type ER100S-1 with appropriate neutral flux was chosen because it yielded superior mechanical properties — strength, ductility and roughness values — were equal to or greater than the Ni-MO-V base metal properties.

It was further determined (via welding of test plates) that parametric controls consistent with welding HY80-/HY100 steels may be utilized. Voltage, amperage and travel speed settings were chosen whereby heat inputs would be limited to 55KJ/in. The Ni-MO-V steels are air hardenable steels with preheat specified at 200° F. (minimum) to 250° F. (maximum). In this manner, the temperature during the welding operation is high enough to diffuse hydrogen out of the weld puddle, and low enough to not impair toughness. While such a narrow temperature range slows down the welding operation, it is necessary to satisfy the various requirements.

Upon placement of the rotor in a lathe, the welding torch was located offset from a top dead center position by 10°–12° in a direction opposite the direction of rotation of the rotor. This was determined to be the optimum position, and relatively minor deviations from the determined optimum can have a significant effect on weld quality. For example, if the torch is not properly positioned, molten flux may be entrapped in the solidifying weld puddle, or flux coverage may be lost, exposing the molten puddle to atmosphere which results in oxidized metal, porosity or lack of fusion.

It was further determined that the granular flux must be held in a position which is directly over the weld puddle. The flux was contained in a spring-loaded cup-like configuration, which allowed for the maintenance of perpendicularity between the flux and molten metal. Weld passes resulting from this set-up had a desirable slightly convex contour. As rotor diameter increases beyond about 6 inches, however, welding approaches a flat position, so that criticality of the weld torch and flux dam settings becomes less demanding.

Figure 5:
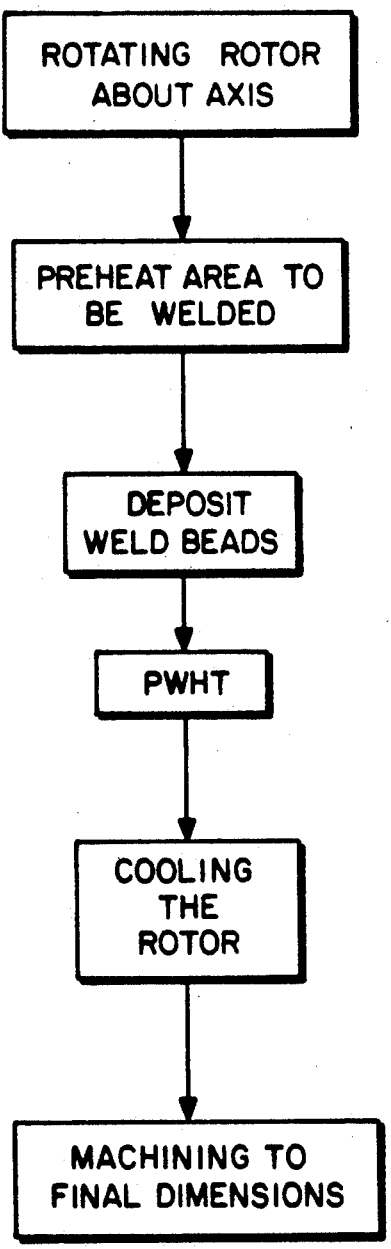
FIG. 5 is a block diagram illustrating the preferred process steps in accordance with the invention.

Following set up of the welding equipment, induction heating coils were located in the appropriate area of the rotor. With reference to FIG. 5, after commencement of rotation of the rotor, the induction heating coils were energized to achieve a 200° F. preheat in the weld area and the adjacent base metal. Utilizing submerged arc welding, weld beads were then deposited on the rotating rotor (in a repair situation, the defect would first be machined out of the rotor, and the weld material would be deposited in the machined area to build up this area), such that each bead intersected the longitudinal centerline of the previously deposited pass, thereby tempering the previous weld pass, and reducing overall stresses. Several weld layers were deposited in this manner, including one additional layer beyond that which was required. Welds made with the SAW procedure demonstrated coarse columnar grains in the final layer due to the slow cooling caused by the flux layer. The final layer does not have the benefit of the tempering effect of subsequent passes.

Figure 6:
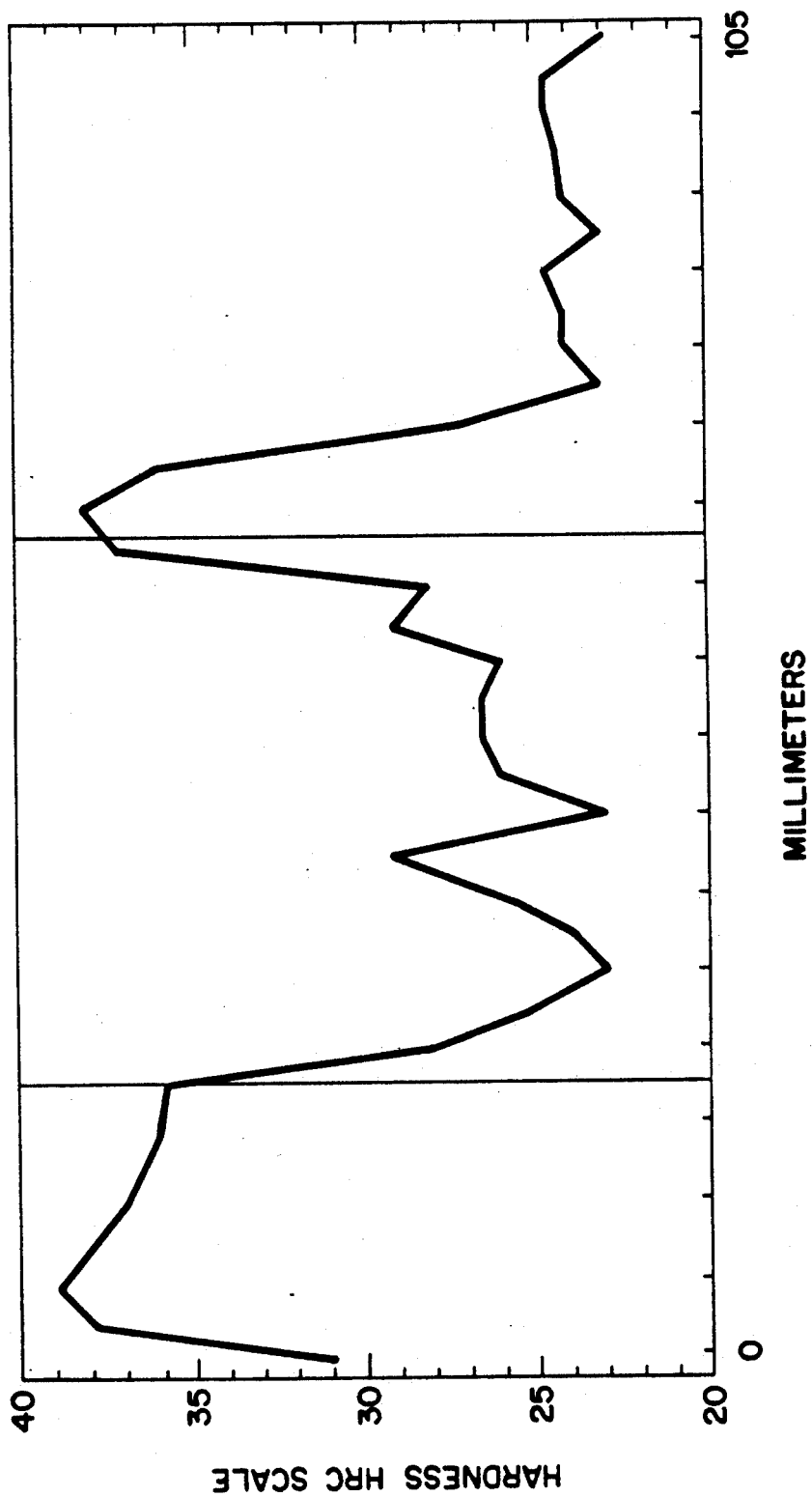
FIG. 6 is a plot of test weld hardness illustrating hardness in the heat-affected-zone with resistance heat post weld heat treatment.
Figure 7:
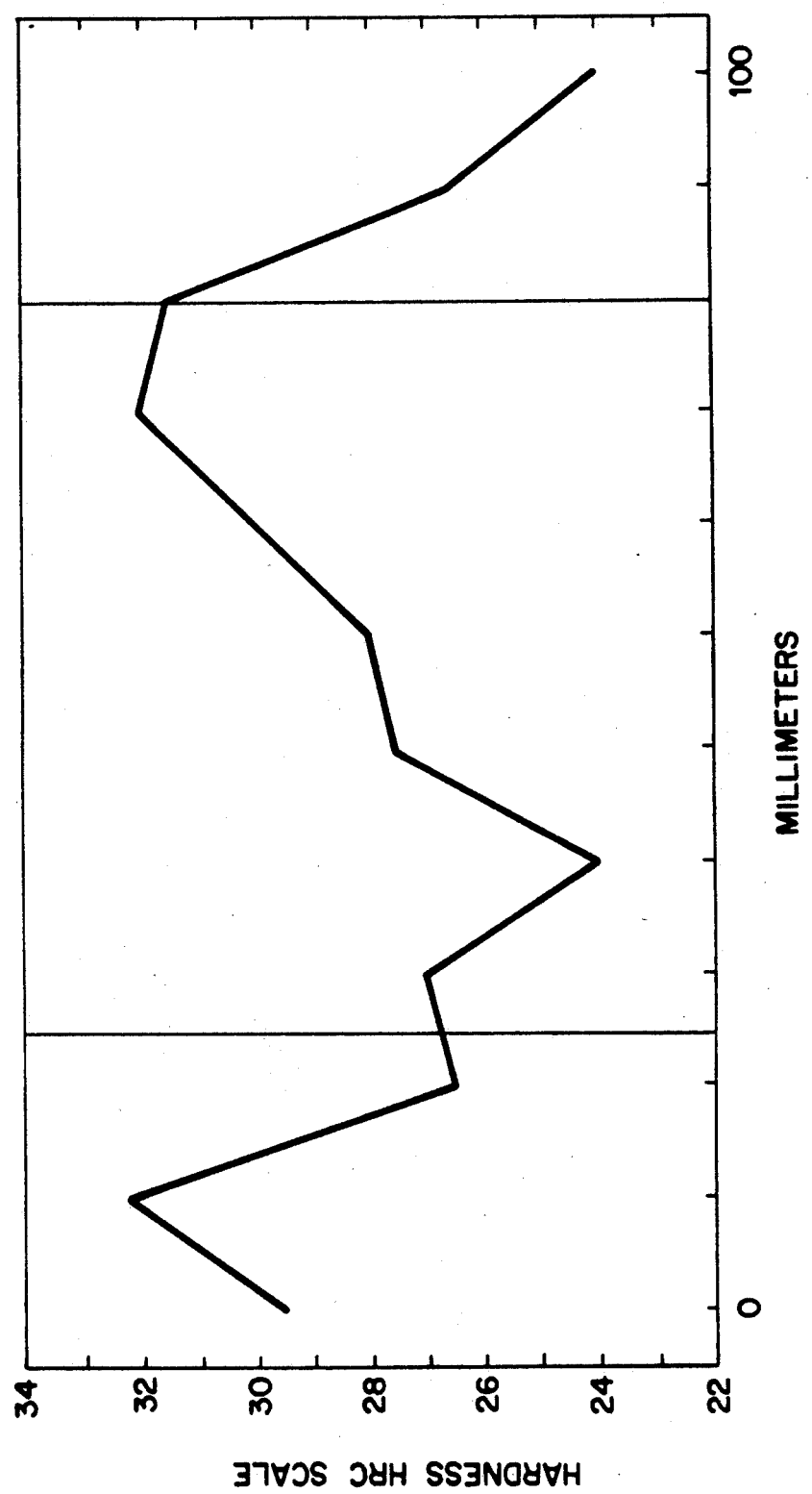
FIG. 7 is a plot similar to FIG. 4 with high frequency induction heat post weld heat treatment in accordance with this invention.

After completion of the welding operation, and during continued rotation of the rotor, the PWHT was conducted, utilizing HFI heating as described hereinabove, so as to heat only that area of the shaft which needs stress-relieving, i.e., the welded surface and heat-affected-zone (HAZ). As was previously mentioned, the induction method for PWHT is preferred for distortion control. However, since induction heating is analogous to heating from the center out, the time at temperature to achieve a fully tempered weld metal and HAZ is greatly reduced. FIGS. 6 and 7 illustrate this fact. While the time at temperature for induction heating (FIG. 4) was only ½ hour, as compared to the resistance heated sample (FIG. 6) which was for four hours, the maximum hardness, in the HAZ, was less (Rc32 vs. Rc36). While the hardness levels in the HAZ are fairly high, this does not reflect an untempered condition. Two other factors are relevant regarding shorter times at temperature. While Ni-MO-V steels are not prone to temper embrittlement, older rotors with less controlled trace elements may effect this supposition. Furthermore, vanadium-bearing steels are subject to secondary hardening effects. For these reasons, it was deemed advisable to keep the time at PWHT temperature relatively short.

It will be appreciated that specific temperatures and/or temperature ranges for PWHT procedures will vary with the metals used. In this instance, using Ni-MO-V steel, the temperature was 1050° F. Following PWHT, the rotor was allowed to cool to room temperature, while continuing to rotate about its longitudinal axis, to thereby further insure uniformity of an remaining stresses in the HAZ of the rotor. The weld area was then machined to achieve the final dimensions. Subsequent non-destructive magnetic particle inspection procedures were applied, confirming a defect-free weldment, without distortion in the rotor and without any negative property changes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process of welding a rotatable machine component comprising the steps of:
    a) rotating the component about a longitudinal axis of rotation thereof;
    b) preheating an area of the component to be welded;
    c) depositing a plurality of weld beads in said area;
    d) post weld heat treating said area; and
    e) cooling said area to room temperature;
   wherein steps b) through e) are carried out during continuous rotation of said component.

2. The process of claim 1 wherein step c) is carried out utilizing a submerged arc welding process.

3. The process of claim 1 wherein step b) is carried out utilizing high frequency induction heating.

4. The process of claim 1 wherein step d) is carried out utilizing high frequency induction heating 5. The process of claim 1 wherein steps b) and d) are carried out utilizing high frequency induction heating.

6. The process of claim 1 wherein during step c), each weld bead is deposited so as to intersect the longitudinal centerline of the previously deposited bead.

7. The process of claim 1 wherein, during step c), a plurality of layers of weld beads are deposited in said area.

8. The process of claim 1 wherein, prior to step a), said area is prepared for welding.

9. The process of claim 1 wherein, after step e), said area is machined to final dimensions.

10. The process of claim 1 wherein said component is a turbine rotor.

11. A process of repairing a defect in a turbine rotor by welding comprising the steps of:
    a) removing the defect by machining an area containing the defect;
    b) rotating the rotor about its longitudinal axis of rotation;
    c) preheating said area and adjacent areas to a predetermined temperature;
    d) welding said area;
    e) post-weld heat treating said area at predetermined temperatures; and
    f) cooling said rotor to room temperature; wherein said rotor is continuously rotated during steps c) through f).

12. The process of claim 11 wherein step c) is carried out utilizing induction coils.

13. The process of claim 11 wherein step e) is carried out utilizing induction coils.

14. The process of claim 12 wherein step e) is carried out utilizing induction coils.

15. The process of claim 11 wherein step e) is carried out such that heating is controlled only to a depth necessary to treat said area and said adjacent areas.

16. The process of claim 11 wherein, prior to step a), non-destructive evaluation of the defect is carried out to determine the extent of the defect.

17. The process of claim 11 wherein, prior to step b), a welding torch is located adjacent the defect such that, relative to a vertical line passing through the longitudinal axis of rotation of the rotor, the torch is offset 10-12° in a direction opposite the direction of rotation of the rotor.

18. The process of claim 11 wherein said rotor is comprised of Ni-MO-V steel and, during step c) said area is heated to a temperature between about 200° F. to about 250° F.

19. The process of claim 18 wherein, during step e) said area is heated to about 1050° F.

20. A turbine rotor welded in accordance with the process of claim 11.

* * * * *